United States Patent [19]

Stoneman

[11] Patent Number: 4,712,831
[45] Date of Patent: Dec. 15, 1987

[54] JAW ALIGNMENT PIN FOR A STRETCH JAW CHUCK

[75] Inventor: Everett L. Stoneman, San Diego, Calif.

[73] Assignee: Rohr Industries, Inc., Chula Vista, Calif.

[21] Appl. No.: 2,246

[22] Filed: Jan. 12, 1987

[51] Int. Cl.$^4$ .............................................. B23B 31/10
[52] U.S. Cl. ........................................ 279/123; 279/55
[58] Field of Search ..................... 279/1 B, 54, 55, 56, 279/57, 58, 59, 123; 403/348

[56] References Cited

U.S. PATENT DOCUMENTS

| | | | |
|---|---|---|---|
| 2,379,984 | 7/1945 | Nereaux | 403/348 X |
| 2,864,623 | 12/1958 | Spink | 279/55 X |
| 3,032,281 | 5/1962 | Wexell | 403/348 X |
| 3,370,144 | 2/1968 | Arthur et al. | 403/348 X |
| 4,239,246 | 12/1980 | Howlett | 279/123 X |
| 4,361,286 | 11/1982 | Hofmann et al. | 403/348 X |

*Primary Examiner*—Gil Weidenfeld
*Assistant Examiner*—Glenn L. Webb
*Attorney, Agent, or Firm*—Patrick J. Schlesinger; Frank D. Gilliam

[57] ABSTRACT

A pin assembly for removably attaching a jaw portion of a translatable jaw of a stretch jaw chuck through an elongated slotted opening in the chuck wall. A bushing is threaded into mating threads in a bore in the jaw portion. The bushing has a centrally positioned substantially rectangular shaped opening extending therethrough with a slot formed on the bottom exterior surface of the bushing adjacent to each elongated side of the rectangular opening therethrough. An attachment pin is provided with a first end configured to pass through the opening in the bushing and latch into the aligned slots on the outer surface. The pin has a coil spring confined between a pair of flat washers. The first washer adjacent the second end of the pin rides against a nut adjustable along a threaded portion of the pin. When the first end of the pin is inserted through a selected slotted opening in the chuck housing, through the bushing floor opening and rotated into locking engagement with the slots, the pin is secured to the bushing by the second washer biased by the spring against the chuck housing outer surface. The pin assemblies removably connected to the jaw portions are translatable along the slots relative to the chuck housing.

9 Claims, 5 Drawing Figures

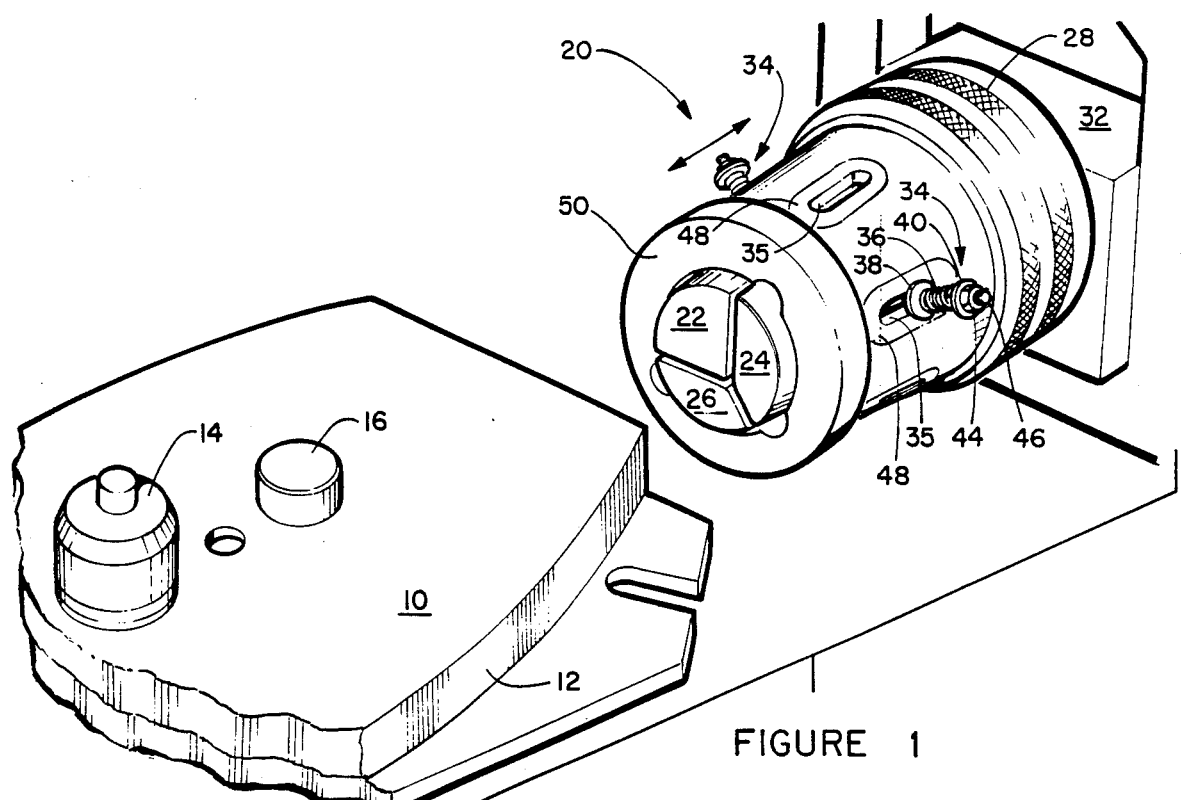
FIGURE 1
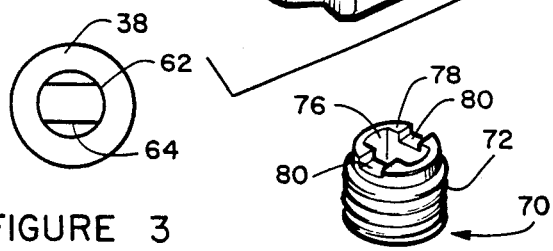
FIGURE 3
FIGURE 4
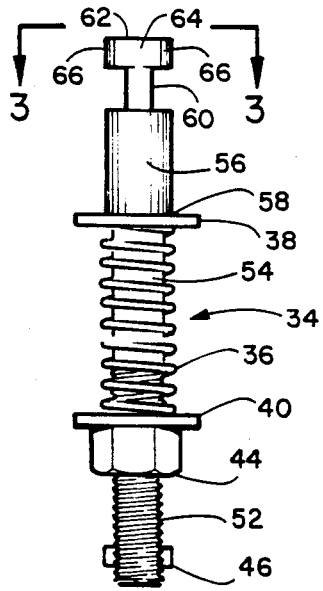
FIGURE 2
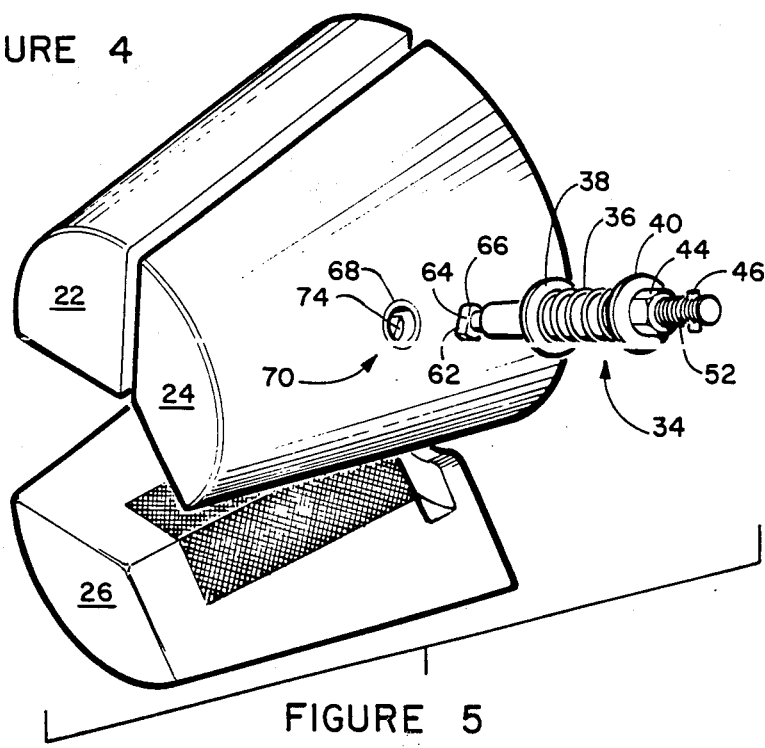
FIGURE 5

JAW ALIGNMENT PIN FOR A STRETCH JAW CHUCK

BACKGROUND OF THE INVENTION

The invention is directed to an attachment pin for operatively holding a jaw portion of a translatable jaw of a chuck being used for the stretch forming of metals and more particularly to an attachment pin that has a twist lock connect/disconnect attachment to the jaw portion.

The state of the art disconnect pin of the type used to connect a jaw portion positioned within a stretch jaw chuck has the general configuration of a stud threaded on each end with a different thread pitch not unlike those used to secure an engine head to the block. The jaws of the type used for stretch forming are formed in several segments so as to conform to the end of the metal to be stretch formed. The jaw segments are placed within a conically configured chuck housing. The jaw portion is translatable forward and aft relative to the chuck housing for selected metal gripping pressure. The outer circumference of the chuck has spaced apart slotted apertures therethrough. For stretch forming, the metal workpiece to be formed is fastened securely at one end, positioned around a fixed in position male die configured to the approximate shape of the ultimate stretch formed metal workpiece and the free end of the metal workpiece is then placed between the jaw portions of the chuck. The jaws are then translated forwardly in the chuck housing to tighten the jaw portions onto the free end of the metal workpiece. The chuck and jaw portions are then translated together rearwardly stretching the workpiece to the shape of the die. The jaw portion is then translated relative to the chuck housing to release the jaw from the end of the now formed metal workpiece. The formed workpiece is then removed from the connected end and die. The same process is repeated for like formed parts.

When different configured metal parts are formed, the jaw portion must be changed to adapt to the configuration of different shaped metal parts to be held and stretched, i.e. two or more differently or like configured jaws may now be needed. To change the jaw portions the studs are unthreaded from the jaw portions and the jaws are removed. Different jaw portions are now installed in the chuck housing and the stud is inserted through the slotted apertures in the chuck housing and rethreaded into the new jaw portions. Because the jaw portions are generally constructed of Kirksite, they are brittle and after a period of use, the threaded apertures therein are destroyed rendering the jaw portions prematurely unusable. Also the exchange of jaw portions using the state of the art threaded studs takes considerable time due to the threading and unthreading of the studs from the jaw portions.

There has not been a satisfactory pin for the use described above to extend the life of the jaw portions and reduce the replacement time of jaw portions replacement until the emergence of the instant invention.

SUMMARY OF THE INVENTION

The present invention is directed to a novel pin assembly for guiding and positioning the jaw portion of a stretch jaw chuck that includes a bushing which is permanently threaded into the conventional threaded bore in a jaw portion. The pin of the assembly is then inserted through a conventional slotted aperture of the chuck housing, and through the bushing, and rotated into locking slots on the bottom surface of the bushing where bias from a coil spring mounted on the pin bears against the outer surface of the chuck housing to secure the pin to the bushing.

The pin can be easily and quickly removed by pushing the pin inwardly a distance slightly greater than the depth of the locking slots in the bottom surface of the bushing, rotating it 90°, and then withdrawing it from the bushing and chuck housing. In this manner, the threads in the aperture of the jaw portion are not affected by jaw portion changes. Once the bushing is threaded into the threaded bore of the jaw portion it is never removed therefrom during the useful life of the jaw portion.

An object of the invention is to provide a quick disconnect means for removing and installing differently configured jaw portions of a stretch jaw chuck without causing premature damage to the jaw portions.

Another object of the invention is to provide a quick disconnect means which reduces the down time of a stretch jaw chuck forming system.

These and other objects of the invention will become readily apparent to those knowledgeable in the stretch forming art when the following specification and drawing Figures are considered together.

BRIEF DESCRIPTION OF THE DRAWINGS

FIG. 1 is a partial showing of a metal forming die and stretch forming chuck employing a preferred embodiment of the invention;

FIG. 2 is a side view of the jaw portion guiding pin of the invention;

FIG. 3 is a bottom view thereof taken along line 3—3 of FIG. 2;

FIG. 4 is a perspective of the bushing of the invention; and

FIG. 5 is a showing of three jaw portions removed from the chuck with the pin of the invention illustrated in position for insertion into a bushing of FIG. 4 that has already been positioned in a jaw portion.

DETAILED DESCRIPTION OF THE DRAWINGS

Referring now to the drawings and specifically to FIG. 1. FIG. 1 depicts a cutaway of a stretch forming die 10 having a suitable arcuate metal forming surface 12. The forming die 10 is fixedly secured to a fixed surface (not shown) by means of locking pins 14 and 16. Additional locking pins may be positioned through side slots 18 (one shown). A suitable stretch forming chuck 20 with three jaw portions 22, 24, and 26 installed therein is shown in FIG. 1 and in actual practice is positioned a suitable distance from die 10 in accordance with the metal workpiece to be stretch formed. A threaded ring 28 secures the chuck housing 30 to a translatable structure 32 for forming purposes. A guide pin 34 embodying the present invention is connected to each of the jaw portions. Elongated slots 35 provided in the chuck housing 30 allow the jaw portions to translate relative to the chuck housing 30 for the gripping and releasing of an end of the metal pieces to be stretch formed. The pin 34 includes a washer 38 and a like washer 40 with a spring 42 captured therebetween. A nut 44 adjusts the bias tension on spring 42 by moving washer 40 toward washer 38 against the spring tension. A keeper 46 passes through a bore on the outer end of the pin 34 to prevent the nut 44 from being inadvertently removed from the pin 34 releasing the spring 36.

With the pins 34 installed as shown in FIG. 1, the washers 38 slide along the outer surface of the chuck housing 30, along area 48, when the jaw portions are translated relative to the chuck housing 30.

In operation, one end of the part or material to be stretch formed is held fast by fixed securing means (not shown) and the free end is inserted in the slots between the separated jaw portions 22–26. For example, the part or material to be inserted in the jaws shown has a substantially "Y" shaped configuration. The jaw portions are then advanced forward relative to the chuck housing 30 and attached end ring 50 by means (not shown) which causes the conic shaped outer configuration of the jaw portions to be forced together to grip the part or material with a force sufficient to hold the free end of the part for stretch forming. The translatable structure 32 which supports the chuck is then translated rearwardly to force the part or material against the metal forming surface 12 of the die 10.

After the stretch forming operation is completed, the jaws 23, 24 and 26 ar moved away from the stretch forming die 10 and the now stretch formed part or material is released therefrom.

The jaw portions 22–26 are generally constructed from relatively soft metal, as for example, Kirksite, to prevent damage to the part or material gripped therebetween. It should be understood that many different shaped parts or material are stretch formed using the same chuck. Obviously, each time a different jaw is required within the chuck, a pin 34 must be removed from the cooperating jaw portion for jaw portion removal and replacement.

Referring now to FIGS. 2–5, it will be seen that the details of the pin 34 include a threaded portion 52 on which the nut 44 is threadedly engaged, a central smooth annular portion 54 over which the spring 34 is loosely positioned, an enlarged diameter portion 56, a shoulder 58 between the smaller diameter smooth portion 54 and the enlarged diameter portion 56 retains the washer 38 against the bias of the spring 36, a necked down portion 60 separates the enlarged diameter portion 56 and a connecting foot 62, which has rectilinear side walls 64 and curvilinear ends 66. The washer 40 is positioned at the opposite end of the spring 36 from washer 38 and is adjustable along threaded portion 52 by means of the nut 44 and the keeper 46 prevents inadvertent removal of the nut from the threads.

Each jaw portion includes a threaded bore 68 which is alignable with the opening of slot 36 when the jaw portion is installed in the chuck housing 30.

A bushing 70 has threads 72 on its outer surface which engage the threads in bore 68 for installation within the bore as shown in FIG. 5. The annular inner surface 75 of the bushing 70 forms a smooth bore slightly larger in diameter than the enlarged diameter portion 56 of pin 34. The inner end portion 74 of bushing 70 is provided with an opening 76 configured to permit foot section 62 of pin 34 to extend therethrough. On each side of opening 76 on the bottom surface 78 of the bushing 70 is a slot 80. The slots 80 are aligned and configured to receive the ends 66 of foot 62.

In use, the bushing 70 is inserted into the bore 68 so as to have an outer end flush with the outer surface of the jaw portion where it remains permanently.

The jaw portions 22, 24 and 26 with the bushing 70 in place, are installed into the chuck housing 30 in a conventional and known manner. Each pin 34, as shown in FIG. 5, is then inserted through the slot 35 of the chuck housing 30, into the bushing 70 with the foot portion 62 passing through opening 76 and extending slightly beyond end portion 78 so as to permit the ends 66 to then rest upon end poriton 78. The pin 34 is then rotated so that the ends 66 align with slots 80 (shown as approximately 90° of rotation) and released whereby the bias of spring 36 against washer 38 pulls the foot into locking engagement with the slots 80. The nut 44 is pre-adjusted along the threads 52 for proper tension between washer 38 and the chuck housing surface 48. The jaw portions 22, 24 and 26 are now locked in their normal operating position.

To remove the jaw portions 22, 24 and 26 the pin 34 is pushed inward, rotated for foot 62 alignment with opening 76 and withdrawn from the bushing 70 and chuck housing 30.

It should be understood that the continual removal and insertion of the pin 34 does not damage the jaw portions 22, 24 or 26 as did the threaded stud of the prior art and the jaw portions can be changed in a much faster manner.

The above-described embodiment of this invention is merely descriptive of its principles and is not to be considered limiting. The scope of this invention instead shall be determined from the scope of the following claims including their equivalents.

What is claimed is:

1. A pin assembly for maintaining a jaw portion in a predetermined position within a translatable jaw housing of a stretch jaw chuck, said jaw housing having a bore therein and said chuck housing having a plurality of spaced apart elongated openings, the elongation of the openings extending in the direction of movements of said jaw portion with the chuck housing and comprising:
    a bushing with a central aperture therethrough with an inner bottom exterior surface thereon carried by each jaw portion;
    a pin having a first end insertable through one of said slotted openings in said chuck housing and through said central aperture in said bushing for removable locking engagement with said bottom exterior surface of said bushing and a second end extending outwardly from said slotted opening; and
    a bias means carried by said pin and located intermediate said slotted opening and said second end for maintaining pin locking engagement with the bottoom exterior surface of said bushing.

2. The invention as defined in claim 1 wherein each jaw portion is provided with a radially extending bore that includes internal threads and said bushing includes external threads that mate with the threads in said bore for maintaining said bushing within said bore.

3. The invention as defined in claim 1 wherein said bushing includes an aperture for receiving said first end of said pin therethrough and means for removably locking said pin to said bushing after insertion therethrough.

4. The invention as defined in claim 2 wherein said bushing includes an aperture for receiving said first end of said pin therethrough and means for removably locking said pin to said bushing after insertion therethrough.

5. The invention as referred in claim 3 wherein the aperture in said bushing includes a bottom surface having a substantially elongated rectangular opening therethrough and the exterior surface of said bottom has slots on each side thereof substantially equally spaced from the ends of said elongated opening whereby when said first end of said pin is inserted through said one of said slotted openings through said elongated rectangular giving in said bushing beyond said bottom surface and is rotated substantially 90 degrees said slots lockingly receive said first end of said pin and said bias means carried by the pin maintains said pin locked therein.

6. The invention as defined in claim 4 wherein the aperture is said bushing includes a bottom surface having a substantially elongated rectangular opening therethrough and the exterior surface of said bottom has slots on each side thereof whereby when said first end of said pin is inserted through a slotted opening in said chuck housing and said elongated rectangular opening in the bushing beyond said bottom surface and is rotated said slots lockingly receive said first end and said bias means maintains said pin locked therein.

7. The invention as defined in claim 1 wherein the tension of said bias means is selectively adjustable.

8. The invention as defined in claim 5 wherein said bushing slots are positioned on each elongated side of said elongated rectangular opening.

9. The invention as defined in claim 6 wherein said bushing slots are positioned on each elongated side of said elongated rectangular opening.

* * * * *